United States Patent [19]
Hurtubise et al.

[11] Patent Number: 5,467,971
[45] Date of Patent: Nov. 21, 1995

[54] STRUT ASSEMBLY WITH INTEGRAL BEARING AND SPRING SEAT

[75] Inventors: Diane M. Hurtubise, Kettering; Perry K. Arnold, Beavercreek, both of Ohio; David P. Kudla, Grand Blanc, Mich.; Lawrence E. Armstrong, Centerville, Ohio

[73] Assignee: General Motors Corporation, Detroit, Mich.

[21] Appl. No.: 287,035

[22] Filed: Aug. 8, 1994

[51] Int. Cl.⁶ .................................................. B60G 13/00
[52] U.S. Cl. .................... 267/220; 267/179; 188/322.12; 280/668
[58] Field of Search .................... 188/322.11, 322.12; 267/219, 220, 221, 222, 225, 179; 280/660, 668, 661

[56] References Cited

U.S. PATENT DOCUMENTS

| | | | |
|---|---|---|---|
| Re. 31,184 | 3/1983 | Lederman | 267/220 X |
| 4,175,771 | 11/1979 | Muzechuk et al. | 267/220 X |
| 4,195,862 | 4/1980 | Specktor et al. | 280/661 |
| 4,256,292 | 3/1981 | Sullivan, Jr. et al. | 267/220 |
| 4,531,759 | 7/1985 | Rezanka et al. | 267/220 X |
| 4,690,425 | 9/1987 | Kubo | 280/668 |
| 4,804,169 | 2/1989 | Hassan | 267/220 |
| 5,074,579 | 12/1991 | Evangelisti | 280/668 |
| 5,232,209 | 8/1993 | De Fontenay | 267/220 |
| 5,275,389 | 1/1994 | Pinch et al. | 267/220 |
| 5,338,055 | 8/1994 | Mauz | 280/668 |

FOREIGN PATENT DOCUMENTS

| | | | |
|---|---|---|---|
| 0187970 | 7/1986 | European Pat. Off. | |
| 2625950 | 1/1988 | France | |
| 2605941 | 5/1988 | France | 280/668 |
| 4211176 | 10/1993 | Germany | 267/179 |
| 89/05242 | 6/1989 | WIPO | |

*Primary Examiner*—Robert J. Oberleitner
*Assistant Examiner*—Lee W. Young
*Attorney, Agent, or Firm*—Anthony Luke Simon

[57] ABSTRACT

A quarter car vehicle suspension including a wheel, a bearing having an axis of rotation, the piston rod axis aligned at an acute angle with respect to a spring axis of a coil spring of the suspension, and a spring seat integral with the bearing, wherein the bearing is located between the spring seat and the vehicle body, and wherein the axis or rotation of the bearing is substantially aligned with a spring axis and at an acute angle to the piston rod axis.

3 Claims, 4 Drawing Sheets

1

STRUT ASSEMBLY WITH INTEGRAL BEARING AND SPRING SEAT

The subject of this application is related to the subject of copending U.S. patent application, Ser. No. 08/287,317, filed Aug. 8, 1994, concurrently with this application and assigned to the assignee of this invention. This invention relates to the mounting of a strut assembly in a steerable suspension to a motor vehicle body.

BACKGROUND OF THE INVENTION

It is known in motor vehicle suspension systems, such as McPherson strut or other strut-type suspensions, that side load forces on the strut can increase strut friction. Techniques for side load compensation such as seating the spring on an angle relative to the strut axis and pointing the bottom of the strut slightly outward from vertical, have reduced side load friction from the strut.

FIG. 1 illustrates a prior art front suspension system assembly 10 including a strut and spring. The vehicle body includes a shock tower 12 comprising sheet metal of the vehicle within which is mounted a top mount assembly 14 through which the strut and spring are attached to the vehicle. The top mount assembly 14 comprises integrally molded rubber body 18 and rigid body members 22 and 24, typically made of stamped steel. Top mount assembly 14 is mounted to the body strut tower 12 by bolts 16 integrated into top mount assembly 14 placed through bolt holes in the strut tower 12. The top mount assembly 14 carries a bearing assembly 28 of a known type that is friction fit around the outside of the rubber 18 of the top mount assembly 14 and seats in top mount assembly 14 so that one side of bearing assembly is fixed relative to the top mount assembly and the strut tower. The second side of bearing assembly 28 freely rotates with respect to the first side of the bearing assembly, the top mount assembly and the strut tower.

The free rotating side of the bearing assembly 28 carries a composite spring seat and wedge 30 that is press fit to the outer diameter of the free rotating side of bearing assembly 28. The rubber isolator 32 sits within the spring seat 30 in between the spring 40 and the metal of the seat 30. Isolator 32 acts to prevent high frequency suspension noise in spring 40 from transferring to the spring seat 30 and the vehicle body. Rigid support 34 is press fit within the inner diameter of rigid member 24 of the top mount assembly. Jounce bumper 36, comprising an elastomeric material such as urethane, and the plastic dust cover 38, are snapped within rigid support 34 as shown. Affixed to the damper cylinder 48 in a known manner is the lower spring seat 42 including an isolator 44, made of an elastomeric material such as rubber, within which the spring 40 seats.

During assembly of the piston rod 46 to the top mount assembly 14, the spring 40 is compressed by a manufacturing aid of a known type, until the end of piston rod 46 fits through opening 43 in the mount assembly. Next rate washer 11 and nut 13 are attached to the end of the piston rod 46 thereby holding the rod to the top mount assembly 14. The manufacturing aid then releases the spring, which forces piston rod 46 to its outer most position with respect to damper cylinder 48 and affects the press fit of spring seat 30 to the outer diameter of the free rotating portion of bearing assembly 28.

On the lower end of damper cylinder 48 is attached mounting bracket 50 of a known type, which is affixed with bolts to knuckle 52 of wheel assembly 58. As shown in the Figure, the piston rod axis 60 is substantially coaxial with the axis of bearing assembly 28. Both the piston rod axis 60 and the axis of bearing assembly 28 are at an acute angle, for example, approximately 8°, to the quarter car steer axis also referred to as the king pin axis 54, running between the center of the bearing assembly 28 and the center of the stud of the wheel lower ball joint. An outline of the tire 55 is shown with respect to the suspension unit. As can be seen, the lower end of piston rod axis 60 is mounted at an outward vertical angle with respect to the true vertical axis 61.

SUMMARY OF THE PRESENT INVENTION

Advantageously, this invention provides a strut mounting assembly that allows for a side load compensation to reduce strut friction while also providing reduced steering friction.

Advantageously, this invention provides a strut assembly for a steerable suspension that reduces the level of steering friction felt and improves an on-center feel of the steering system by minimizing memory steer, which is defined as a tendency of the steering system to pull in the direction of the last off center steer.

Advantageously, this invention reduces side loading of the steering bearing in an upper strut mount. This invention achieves the reduced steering friction, the reduction in memory steer, the reduced side loading of the strut upper bearing by an advantageous strut mounting assembly that places the axis of the strut mount bearing assembly substantially coaxial with the quarter car steer axis or king pin axis, or, in an alternative implementation, substantially parallel to or coaxial with the axis of the coil spring of the suspension assembly. Advantageously then, the axis of the upper mount bearing assembly is at an acute angle to the axis of the piston rod of the suspension strut.

Advantageously, this invention provides a bearing for an upper strut mount in a steerable suspension, wherein the bearing comprises an integral structure including a seat for the suspension spring and a wedge for positioning rotational axis of the bearing to a position at an acute angle to the axis of the strut piston rod, aligning the axis of the bearing to either the spring axis or the corner steering axis. By aligning the bearing axis to the spring axis, side loads on the bearing are reduced and bearing friction is reduced. In the embodiment of this invention in which the bearing is aligned with the king pin or steering axis, the bearing rotates about the same axis that the wheel is steered thereby reducing side loads on the bearing imposed by steering maneuvers.

Structurally, the improvements according to this invention are achieved by the apparatus forming an integral wedge, bearing and spring seat comprising: an annular wedge having a first wedge surface adapted for seating against a strut top mount and a second wedge surface having an acute angle to the first wedge surface and including a first annular half race; and a seat portion having first and second axial sides, the first axial side forming a second annular half race and rotatably coupled to the wedge portion so that the first and second annular half races form a bearing race for a set of spherical bearings, the second axial side opposite the second half race forming an annular seat adapted to seat one of a coil spring and a coil spring isolator, wherein the assembly provides the functions of a spring seat, a bearing and a wedge for tilting a bearing axis, wherein the bearing axis is at an acute angle with respect to an axis perpendicular to the first wedge side.

In one example, this invention is implemented in the McPherson strut assembly and includes a strut rod attached to the strut top mount that seats against the first wedge surface, the strut rod having an rod axis at an acute angle to the bearing axis. In one implementation of this invention, the bearing axis is parallel to a spring axis of the coil spring in the suspension assembly thereby minimizing side loading of the bearing.

In another example of this invention, the bearing axis is coaxial to the quarter car steering axis of the suspension.

Advantageously, in yet another example the structure of this invention is embodied by a quarter car vehicle suspension having a quarter car steer axis or king pin axis, a strut including a piston rod having a strut axis wherein the strut axis is at a first acute angle to the quarter car steer axis or king pin axis, a mount assembly affixed to the piston rod and to the vehicle body, a spring having a bottom end seated in a lower spring seat affixed to the strut cylinder and having a top end seated in an integral structure comprising a first body having a wedge shape and first and second wedge sides, the first wedge side seated against the mount assembly and the second wedge side carrying a bearing half race having a bearing axis at a second acute angle to strut axis, a second body having an annular shape and first and second annular sides, the first annular side having a bearing half race that, together with the first body forms a bearing race, trapping a set of ball bearings within and allowing relative rotational movement along the bearing axis between the first and second bodies, the second annular side forming an upper spring seat within which the top end of the spring is seated, thereby providing an acute angle between the piston rod axis and the bearing axis.

A more detailed description of this invention is set forth below.

DETAILED DESCRIPTION OF THE INVENTION

Figure 1:
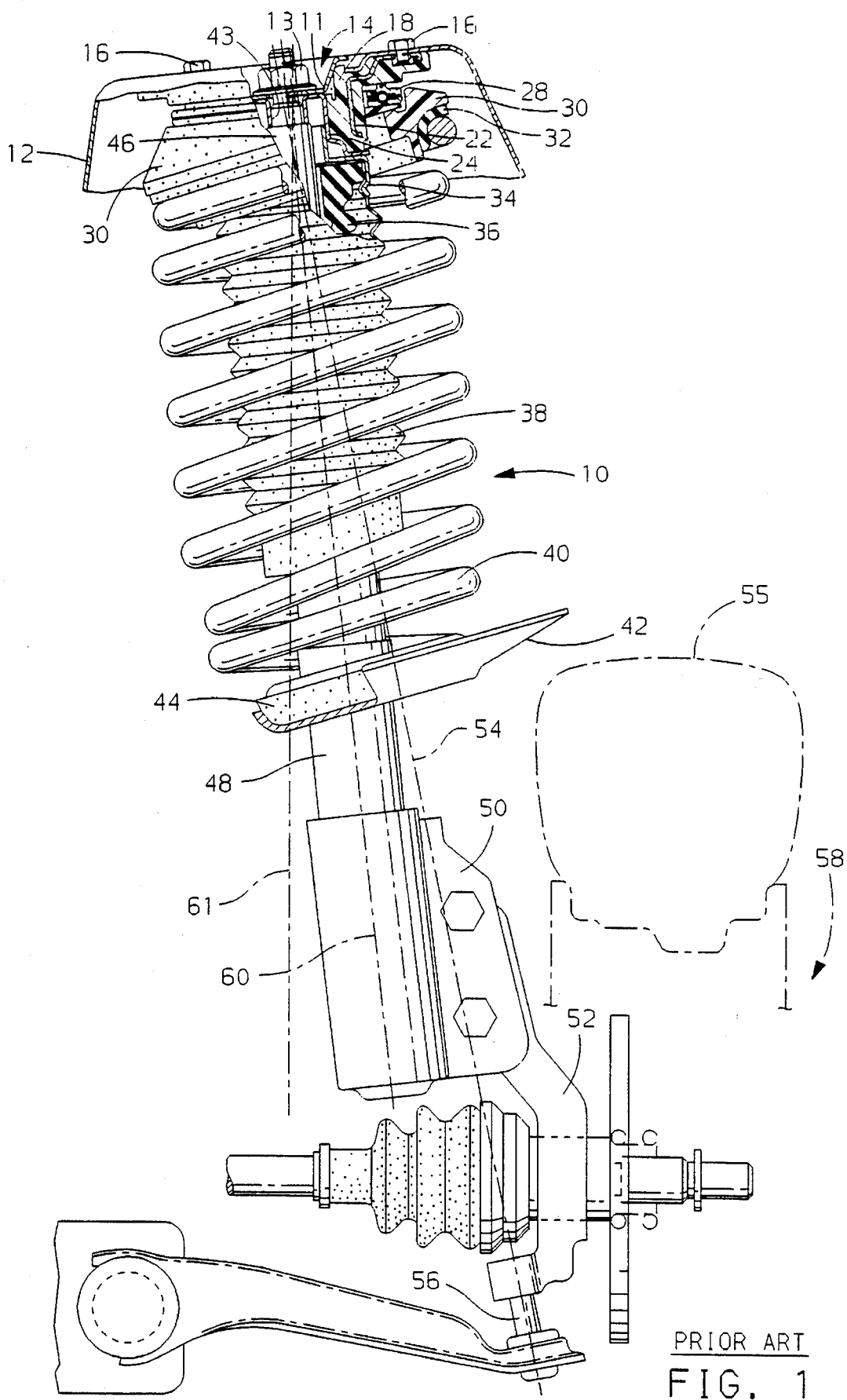
FIG. 1 illustrates a prior art suspension assembly.
Figure 2:
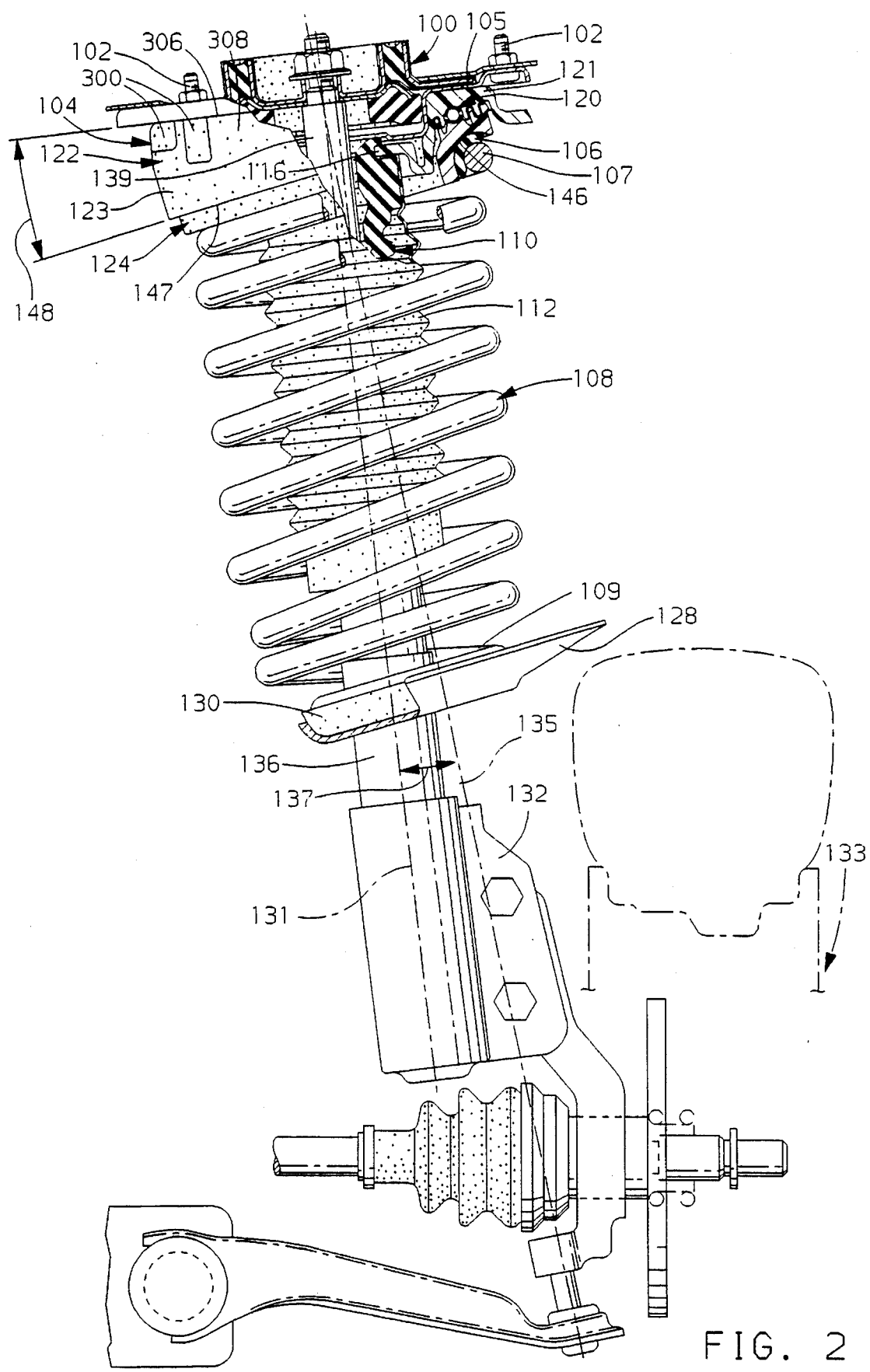
FIGS. 2, 3 and 4 illustrate a suspension assembly according to this invention.

Referring to FIG. 2, a strut assembly including the apparatus of this invention is shown. The assembly has a top mount 100 that mounts to a vehicle strut tower via bolts 102 shown. The integral wedge, bearing and spring seat, according to this invention, is shown as reference 104 and is generally formed of two bodies, the first comprising the wedge body 122 and the second comprising the spring seat body 124. The bodies 122, 124 are maintained in engagement in a manner that prevents the bodies from separating while allowing the spring seat body 124 to freely rotate, responsive to the forces transferred via spring 108, with respect to the wedge body 122.

When the wedge body 122 and spring seat body 124 are assembled, they form an annular passage within which spherical bearings are placed to form the bearing 120. The wedge body 122 has an axially wide end 123 and an axially narrow end 121 providing the wedge profile that tilts the axis of rotation 135 of the bearing 120 into a position where it is at an acute angle 137 with respect to the axis 131 of piston rod 139 and at an acute angle to an axis perpendicular to the surface 105 of wedge body 122.

With the surface 105 of the wedge body 122 seated against top mount assembly 100, the wedge body 122 is fixed in place with respect to the top mount assembly 100. A bearing 120 allows the spring seat body 124 to freely rotate with respect to the wedge body 122 so that, during turning maneuvers of a vehicle including the suspension shown, the spring seat body 124 rotates about axis 135 with respect to wedge body 122 and strut top mount assembly 100 and, therefore, with respect to the vehicle body.

Elastomeric isolator 106, for example, comprising rubber, is seated in an annular seat 146 and acts to isolate from the vehicle body high frequency suspension noises traveling through the spring 108. The top 107 of spring 108 is seated in the isolator 106 and seat 146 and the bottom 109 of spring 108 is seated in lower spring seat 128, also having a similarly functioning elastomeric isolator 130. Lower spring seat 128 is affixed to the outer surface of the damping cylinder 136 through a known method, typically by welding.

The wedge body of the integral wedge, bearing and spring seat 104 includes radially inward extending seat 116 forming an annular seat within which the axially upper end snap portion 114 of jounce bumper 110 engages to achieve a snap fit. Before the jounce bumper 110 is snapped into the seat 116, the dust cover 112, having radially inward extending end 118, is snapped over the shoulder 126 of jounce bumper 110.

Lower bracket 132 is mounted to the damping cylinder 136 in a known manner and is attached to the knuckle of the wheel assembly 133, for example, via bolts.

The integral wedge, bearing and spring seat 104 according to this invention shown, provides a single integral assembly that performs both the bearing and spring seat function. According to this invention, the integral wedge, bearing and spring seat 104 also performs a wedge function that tilts the bearing axis, in one example, substantially parallel to or coaxial with the spring axis and, in another example, substantially coaxial with the quarter car steer axis or king pin axis. Both implementations affect a reduction in steering friction and memory steer, and decrease side loading of the bearing 120. In some vehicles, the quarter car steer axis is substantially coaxial to the spring axis.

EXAMPLE

Figure 3:
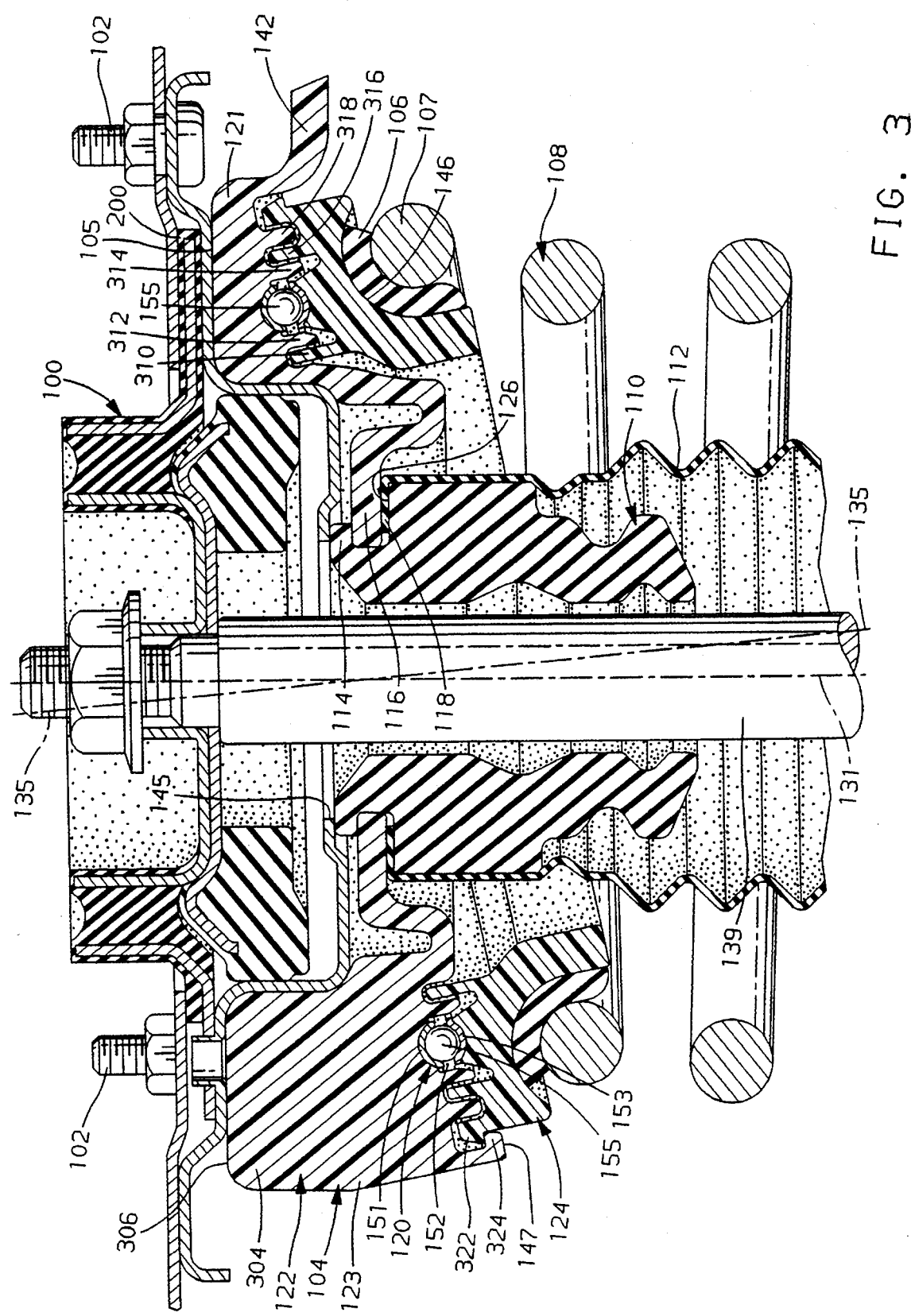
Figure 4:
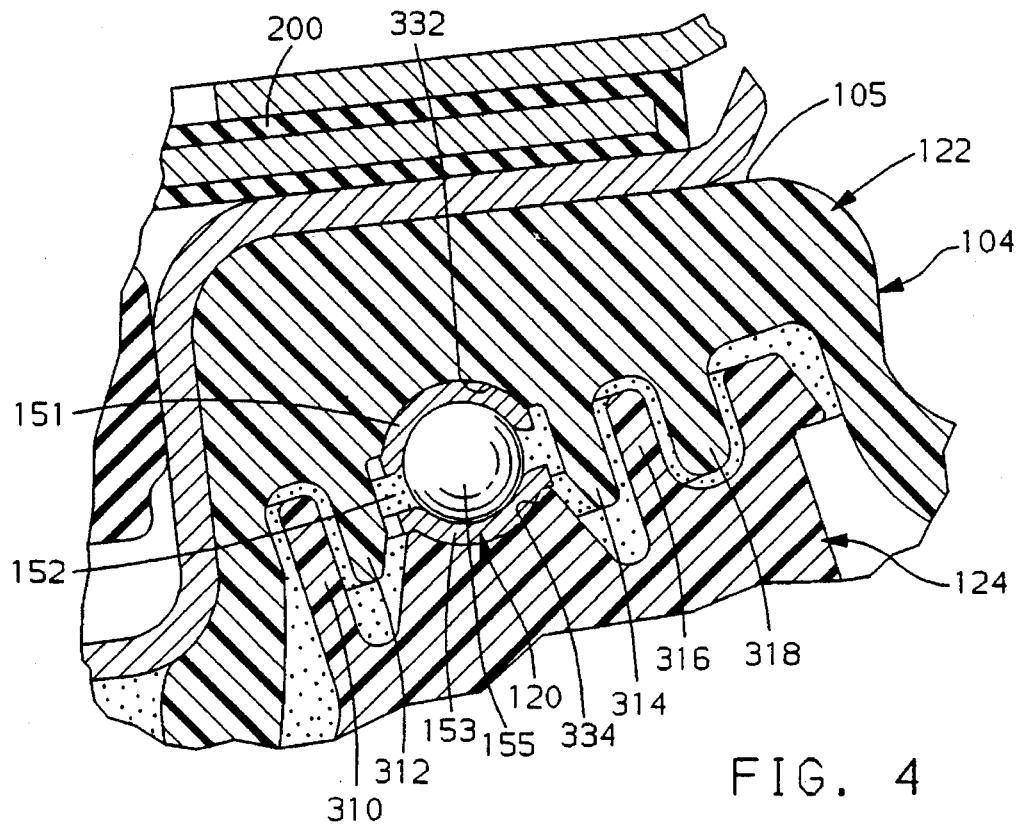
Figure 5:
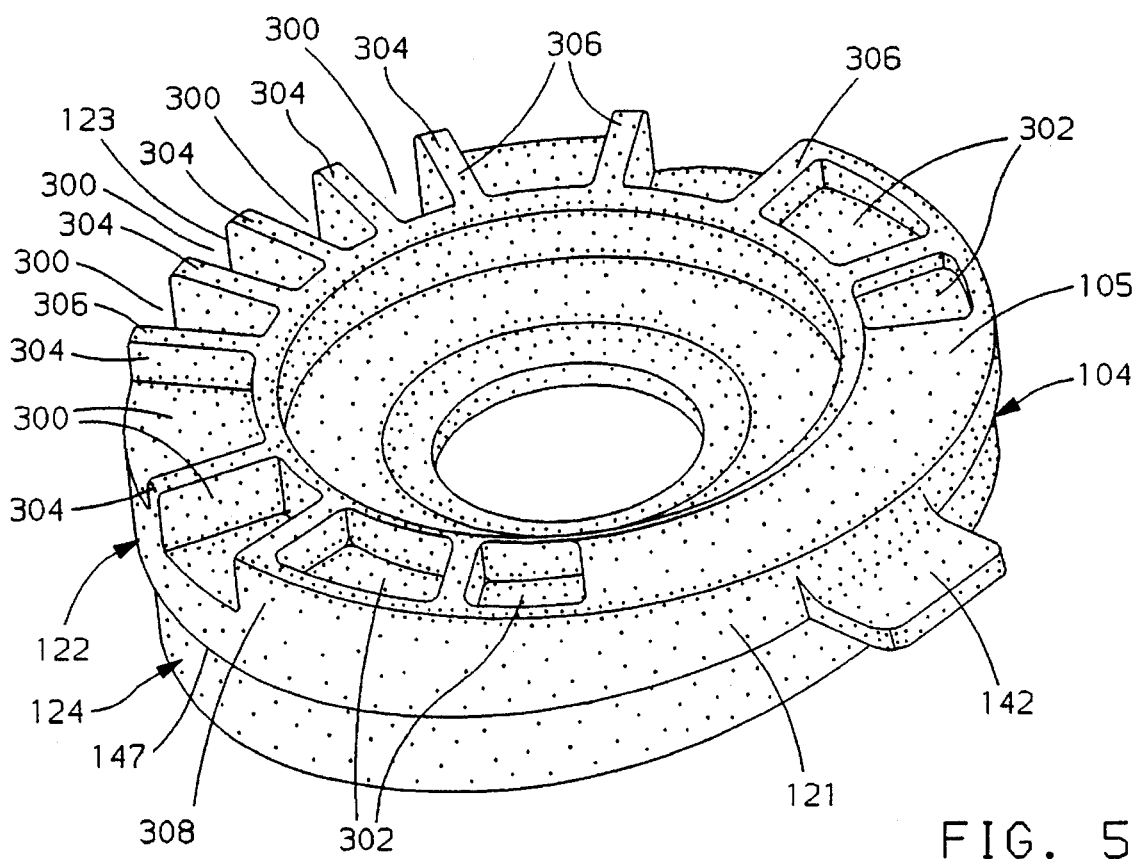
FIG. 5 illustrates an example integral wedge, bearing and spring seat according to this invention.

Referring now also to FIGS. 3 and 4, an example of the integral wedge, bearing and spring seat 104 according to this invention is shown. As can be seen in FIG. 3 showing a first wedge surface forming the seat 105, the assembly forms an annular body around the opening 145 for the strut rod. A plurality of tabs 142 for locating are provided around the periphery of the assembly 104. The wedge body 122 forms an angle between its first surface, seat 105, the seat for the upper mount, and a second surface 147, which is parallel to the first half race (track) 151, giving the wedge profile to the wedge body 122. The angle 148 between the surfaces 147 and 105 (FIG. 2) is equal to the angle 137 between the axis 131, which is perpendicular to the plane of seat 105, and the axis of rotation of the bearing 135 (FIG. 2).

The first half race 151 and the second half race (track) 153 form an annular passage 152 that provides the bearing race within which a plurality of spherical bearings 155 are retained. The wedge body 122 and seat body 124 may be formed from any suitable material that can withstand the load. A preferred example includes 25% glass filled nylon 6/6.

To save weight, a plurality of recesses 300, 302 are shown along a partial annular track of the thicker portions of the wedge 122 proximate to wide end 123. Walls 304 that extend both axially and radially divide the recesses 300 and 302 and include top surfaces 306, all substantially coplanar, which form the seat 105 that seats against the top mount assembly and from the first wedge surface. The recesses 300 open on the radial exterior are provided on the wide end 123 of the wedge and recesses 302, closed in the radial exterior, are proximate the narrow end 121, near which tab 142 is located. The outer partial annular wall 308 closes the radially outward side of the recesses 302 as shown.

The views shown in FIGS. 3 and 4 illustrate a cross section of the integral wedge, bearing and spring seat 104, including the spring seat body 124 together with wedge body 122 and the bearing 120. The seat body 124 is cylindrically symmetrical.

Wedge body 122 includes a plurality of coaxial axially extending annular protrusions 312, 314 and 318 that extend toward the spring seat body 124. The spring seat body 124 includes coaxial radially extending protrusions 310 and 316 extending toward wedge body 122. The protrusions 310, 312, 314, 316 and 318 appear in FIGS. 3 and 4 as interdigitated fingers and provide a blockage preventing against dust and water from entering the bearing race of bearing 120.

On spring seat body 124, radially exterior of the protrusions 310–318 is an axially extending annular engaging feature 320 having a radially outward extending annular lip 322 that operates with radially inward extending annular lip 324 of wedge 122 to provide an annular snapping engagement. The snap engagement functions in a manner typical for steering bearings in that the snap is a loose engagement allowing rotation between seat member 124 and the wedge member 122, while maintaining the engagement tight enough to trap the spherical bearings within the race.

The bearing 120 is formed by the annular surfaces 332 and 334 in the wedge 122 and spring seat 124, respectively. The cross section profile of each annular surface 332, 334 is an axially directed u-shape and the open end of each surface 332, 334 faces the other surface 332, 334 when the wedge and spring seat are assembled together. Seated in the annular surfaces 332 and 334 are annular U-shaped tracks 151 and 153, each also having an axially directed u-shaped profile and positioned so that the open end of the u-shaped profile faces the open end of the u-shaped profile of the other track. Between the two tracks 151 and 153 are a plurality of spherical bearing elements 155 that race within the bearing 120 formed by the tracks 151 and 153. The tracks 151 and 153 may be mounted within the wedge 122 and seat 124 in any suitable manner including, but not limited to: (a) laying the tracks in place and assembling the unit; (b) using adhesive to hold the tracks into the portions 122 and 124; and (c) integrally molding the tracks 151 and 153 during the molding operation of the wedge body 122 and the seat body 124.

A suitable material for both the spring seat body and the wedge body 124 and 122 is 25% glass filled nylon 6/6. Material substitutes can include plastic, variations on the glass fill of the nylon, metal and hard rubber, assuming the rubber can withstand the suspension forces that will be applied to the unit. A suitable material for tracks 151 and 153 is stamped metal.

Since the bearing illustrated has its race parallel to a plane perpendicular to the axis of rotation of the bearing, when, as in the example shown, the seat surface 200 of the top mount assembly is substantially perpendicular to the strut rod axis, the acute angle formed between the axis of rotation of the bearing and the strut rod axis is equal, to the wedge angle between the two axial end surfaces of wedge body 122.

While the above-described embodiment of this invention describes the axis of rotation of the bearing assembly, in one example, substantially coaxial with the quarter car steer axis or king pin axis and, in another example substantially parallel to the spring axis, in actual implementation, the axis of rotation of the bearing assembly may be off slightly from the steer axis or spring axis. Such slight deviation from the preferred placement may sometimes be inescapable due to design constraints and/or part tolerances and those skilled in the art will appreciate that such implementations fall within the scope of this invention. For example, a deviation of 1° to 2° from the preferred axis alignment may be typical while still falling within the scope of this invention.

Moreover, various other improvements and modifications to this invention may occur to those skilled in the art and such improvements and modifications will fall within the scope of this invention as set forth below.

The embodiments in which an exclusive property or privilege is claimed are defined as follows:

1. A vehicle suspension comprising:
   a jounce bumper with an axially upper snap portion; and
   an integral wedge, bearing and spring seat including
      an annular wedge body including a wide end and narrow end, the annular wedge body including a first axial side forming a seat portion and a second axial side including a first annular surface having an axially aligned u-shaped profile, wherein the annular wedge body includes a radially inward extending annular wedge seat having an axially upper surface to which the axially upper snap portion of the jounce bumper engages;
      an annular seat including a first axial side forming a seat for one of (a) a spring and (b) a spring isolator, and a second axial side including a second annular surface having an axially aligned u-shaped profile, wherein the first and second annular surfaces face each other;
      a first annular track having an axially aligned u-shaped profile seated in the first annular surface;
      a second annular track having an axially aligned u-shaped profile seated in the second annular surface, wherein the first and second annular tracks form a bearing race; and
      a set of spherical bearings within the bearing race, wherein the annular wedge body is between the annular seat and a vehicle body.

2. A vehicle suspension according to claim 1, also comprising a dust cover with a radially inward extending end, wherein the radially inward extending end engages a jounce bumper shoulder and is located between the jounce bumper shoulder and an axially lower surface of the radially inward extending annular wedge seat of the annular wedge body.

3. A vehicle suspension according to claim 1, wherein the radially inward extending annular wedge seat extends axially and radially interior of the bearing race.

* * * * *